US009189262B2

(12) United States Patent
Rai et al.

(10) Patent No.: US 9,189,262 B2
(45) Date of Patent: Nov. 17, 2015

(54) METHODS AND SYSTEMS FOR RECOMMENDING SOLUTIONS TO PERFORMANCE ISSUES IN A PRINT PRODUCTION ENVIRONMENT

(71) Applicant: Xerox Corporation, Norwalk, CT (US)

(72) Inventors: Sudhendu Rai, Fairport, NY (US); Eric Michael Gross, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 28 days.

(21) Appl. No.: 14/097,458

(22) Filed: Dec. 5, 2013

(65) Prior Publication Data

US 2015/0160954 A1    Jun. 11, 2015

(51) Int. Cl.
*G06F 9/44*   (2006.01)
*G06F 13/10*  (2006.01)
*G06F 13/12*  (2006.01)
*G06F 9/455*  (2006.01)

(52) U.S. Cl.
CPC ...................... *G06F 9/455* (2013.01)

(58) Field of Classification Search
CPC ........ G05B 19/418; G06F 9/455; G01V 1/30; G06G 7/48
USPC .......................................................... 703/21
See application file for complete search history.

(56) References Cited

U.S. PATENT DOCUMENTS

| | | | |
|---|---|---|---|
| 6,650,946 B2 * | 11/2003 | Bauer | 700/23 |
| 8,190,488 B2 | 5/2012 | Rai et al. | |
| 8,427,479 B2 | 4/2013 | Jacobs | |
| 8,810,821 B2 | 8/2014 | Burke, Jr. | |
| 2003/0149747 A1 * | 8/2003 | Rai et al. | 709/219 |
| 2005/0043848 A1 * | 2/2005 | Wiechers | 700/115 |
| 2005/0065830 A1 * | 3/2005 | Duke et al. | 705/7 |
| 2007/0091355 A1 * | 4/2007 | Rai | 358/1.15 |
| 2007/0236724 A1 * | 10/2007 | Rai et al. | 358/1.15 |
| 2009/0025003 A1 * | 1/2009 | Rai | 718/102 |
| 2009/0030837 A1 * | 1/2009 | Knodt | 705/40 |
| 2011/0035322 A1 * | 2/2011 | Lively | 705/300 |
| 2014/0240737 A1 | 8/2014 | Gross et al. | |
| 2014/0300926 A1 | 10/2014 | Rai et al. | |

OTHER PUBLICATIONS

Rong Zhou, Sedhendu Rai, Minh Do, "Job Scheduling in Lean Document Production" Xerox Parc, May 2011, 4 pages.*

* cited by examiner

*Primary Examiner* — Dwin M Craig
(74) *Attorney, Agent, or Firm* — Fox Rothschild LLP

(57) ABSTRACT

A method of recommending one or more solutions to a performance issue may include receiving operations information associated with a print production environment, determining one or more performance metrics associated with the print production environment based on at least a portion of the received operations information, and determining whether a performance issue associated with the print production environment exists based on one or more of the performance metrics. The method may include, in response to determining that a performance issue exists, identifying a cause of the performance issue, identifying a different configuration of production devices for the print production environment, running a simulation on the different configuration using historical job information associated with the print production environment to determine whether the different configuration mitigates the performance issue, and in response to determining that the different configuration mitigates the performance issue, recommending the different configuration to a user.

18 Claims, 4 Drawing Sheets

METHODS AND SYSTEMS FOR RECOMMENDING SOLUTIONS TO PERFORMANCE ISSUES IN A PRINT PRODUCTION ENVIRONMENT

BACKGROUND

Typically, operators of production environments, such as print shops for example, make decisions concerning purchasing, leasing and/or upgrading production resources when they realize they are not able to meet service level agreements or other obligations. Often, such a decision is made in an ad hoc manner and, as such, is usually not the most beneficial long term decision for the operator.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of recommending one or more solutions to a performance issue in a print production environment may include receiving, by a host computing device, operations information associated with a print production environment, determining, by the host computing device, one or more performance metrics associated with the print production environment based on at least a portion of the received operations information, and determining whether a performance issue associated with the print production environment exists based on one or more of the performance metrics. The method may include, in response to determining that a performance issue exists, identifying a cause of the performance issue, identifying a different configuration of production devices for the print production environment, running a simulation on the different configuration using historical job information associated with the print production environment to determine whether the different configuration mitigates the performance issue, and in response to determining that the different configuration mitigates the performance issue, recommending the different configuration to a user.

In an embodiment, a method of recommending one or more solutions to a performance issue in a print production environment may include receiving, by a host computing device, operations information associated with a print production environment, determining, by the host computing device, one or more performance metrics associated with the print production environment based on at least a portion of the received operations information and determining whether a performance issue associated with the print production environment exists based on one or more of the performance metrics. The method may include, in response to determining that a performance issue exists, identifying a cause of the performance issue to be a high level of labor utilization of one or more operators in the print production environment, recommending a change to an operator work schedule, and causing the operator work schedule to be displayed at a user computing device.

In an embodiment, a system for recommending one or more solutions to a performance issue in a print production environment may include a computing device, and a non-transitory computer-readable storage medium in communication with the computing device. The computer-readable storage medium may include one or more programming instructions that, when executed, cause the computing device to receive operations information associated with a print production environment, determine one or more performance metrics associated with the print production environment based on at least a portion of the received operations information, and determine whether a performance issue associated with the print production environment exists based on one or more of the performance metrics. The computer-readable storage medium may include one or more programming instructions that, when executed, cause the computing device to, in response to determining that a performance issue exists, identify a cause of the performance issue, identify a different configuration of production devices for the print production environment, run a simulation on the different configuration using historical job information associated with the print production environment to determine whether the different configuration mitigates the performance issue, and in response to determining that the different configuration mitigates the performance issue, recommend the different configuration to a user.

DETAILED DESCRIPTION

Figure 1:
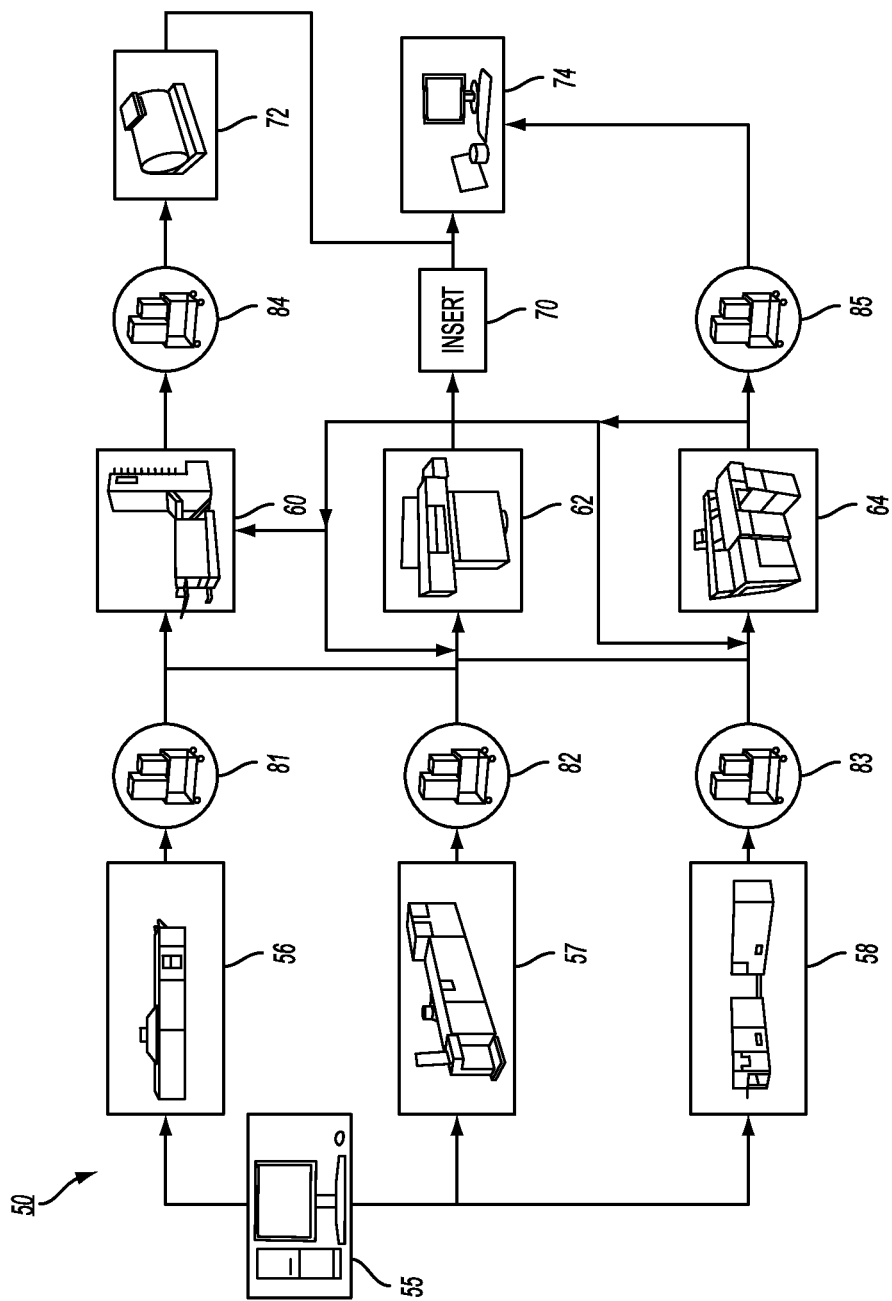
FIG. 1 illustrates an example of a production environment according to an embodiment.

The following terms shall have, for purposes of this application, the respective meanings set forth below:

A "computing device" refers to a device that includes a processor and tangible, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, personal digital assistants, cameras, tablet computers, laptop computers, media players and the like.

"Historical job information" refers to information associated with one or more jobs that are processed by a production environment over a past period of time.

A "job" refers to a logical unit of work that is to be completed for a customer. For example, in a print production environment, a job may include one or more print jobs from one or more clients. For example, a job in a vehicle production environment may include manufacturing a vehicle or a portion thereof. As another example, a job in a chemical production environment may include producing or processing a chemical product or a portion thereof. Similarly, a job in a computing device production environment may be to manufacture a computing device or a portion thereof such as, for example, a printer, a scanner or a copier.

A "performance metric" refers to a performance measure associated with a production environment.

A "print job" refers to a job processed in a print shop. For example, a print job may include producing credit card statements corresponding to a certain credit card company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "production device" refers to a device used to process at least a portion of a job. Examples of production devices in a print shop may include, without limitation, printers, inserters, binders, punchers, collators, multi-function devices or other similar equipment and/or the like.

A "production environment" refers to machine and/or human labor used to complete one or more jobs. A production environment may include one or more devices or other equipment that may be used to complete one or more jobs. Example production environments may include, without limitation, a print production environment, a chemical production environment, a vehicle production environment, a computing device manufacturing production environment, and/or other manufacturing production environments.

A "resource" refers to a production device and/or a human operator in a production environment.

A production environment may include one or more autonomous production cells that each may include one or more production devices. In an embodiment, a cell may include one or more devices that are capable of delivering at least one type of job. For example, in a print shop, a cell may include production devices such as, for example, multiple printers, a shrink-wrapper and a computerized control system. A different cell may include printers, cutters and copiers. In an embodiment, print jobs may be intelligently routed to cells to provide desired load balancing and/or throughput. The use of cells may help decrease the amount of work in progress and labor and inventory costs associated with processing jobs, and may increase the utilization of the production devices in a production environment.

FIG. 1 shows an example of a production environment 50, in this case, example elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Figure 2:
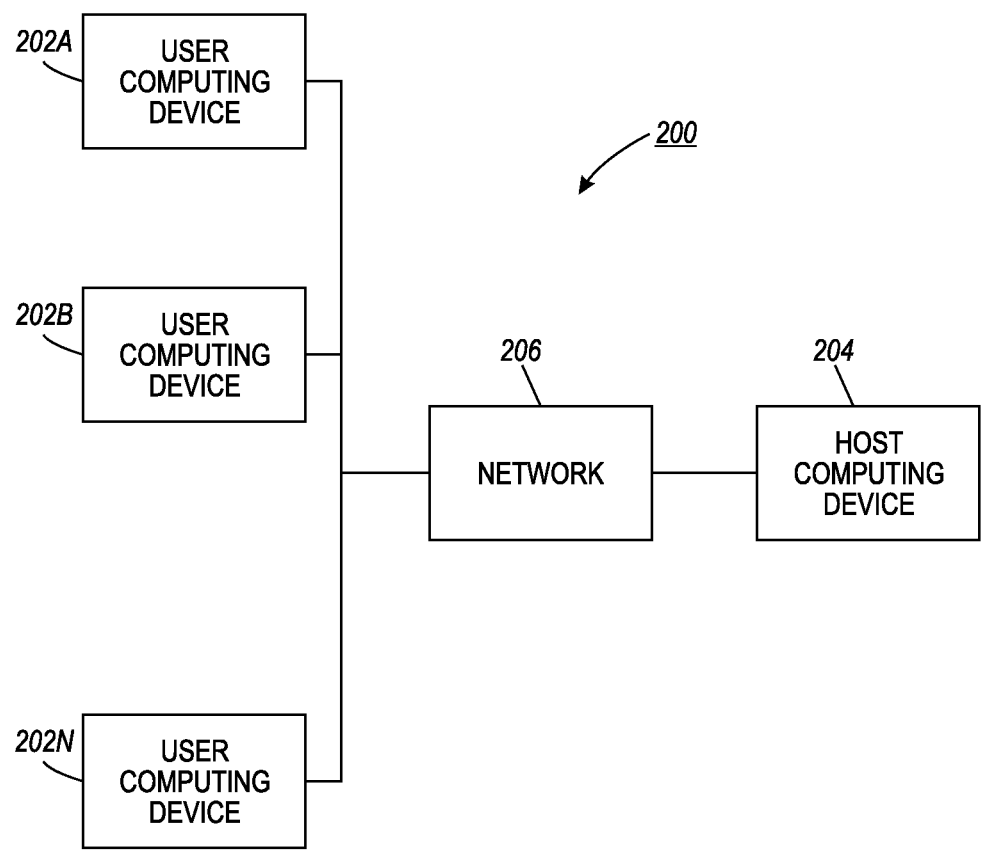
FIG. 2 illustrates an example recommendation system according to an embodiment.

FIG. 2 illustrates an example recommendation system according to an embodiment. As illustrated by FIG. 2, a recommendation system 200 may include one or more user computing devices 202a-N and a host computing device 204 in communication with the user computing devices via one or more networks 206.

In an embodiment, a user computing device 202a-N may be a computing device associated with a user of a recommendation system such as, for example, a production environment operator, manager and/or the like. Examples of a user computing device 202a-N may include, without limitation, a laptop computer, a desktop computer, a tablet, a mobile device and/or the like.

In an embodiment, a host computing device may be a computing device that is configured to manage production environment information across one or more production environments and make recommendations regarding one or more resources of such production environments. Examples of a host computing device 204 may include, without limitation, a server, a mainframe or other computing device.

In an embodiment, a communication network 206 may be a local area network (LAN), a wide area network (WAN), a mobile or cellular communication network, an extranet, an intranet, the Internet and/or the like. In an embodiment, a communication network 206 may provide communication capability between one or more user computing devices 202a-N and a host computing device 204.

Figure 3:
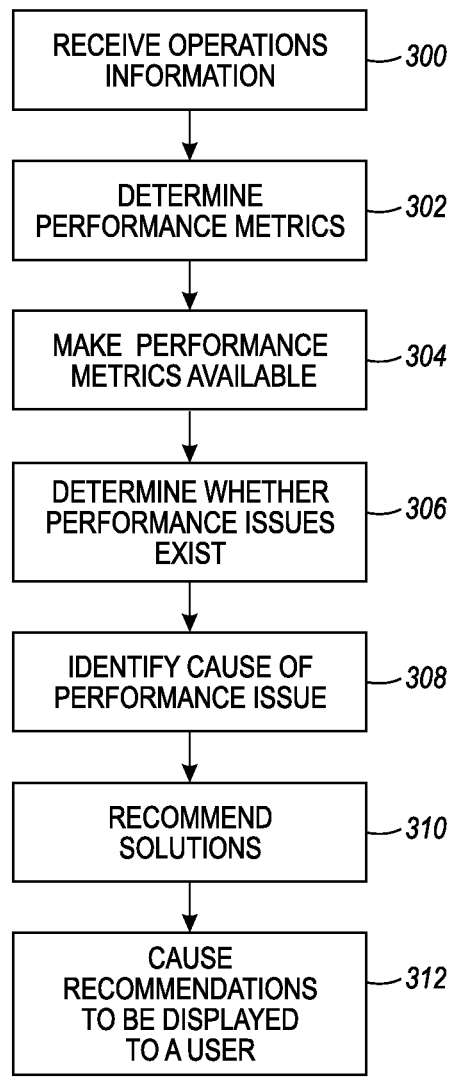
FIG. 3 illustrates an example method of recommending one or more solutions according to an embodiment.

FIG. 3 illustrates an example method of recommending one or more solutions to one or more performance issues in a production environment according to an embodiment. As illustrated by FIG. 3, a host computing device may receive 300 operations information from a user computing device. Operations information may include certain information about the operation of a production environment. For example, for a print shop, operations information may include information about one or more print jobs processed by the print shop such as, for example, the tasks that were necessary to complete the print jobs, the sizes of the print jobs, the turnaround times associated with the print jobs and/or the like.

In an embodiment, operations information may include resource information associated with a production environment. Resource information may include information associated with one or more resources of a production environment, such as, for example, a resource type, a number of resources, capabilities of one or more resources, throughput, setup time, labor requirement(s), hours of availability, failure characteristic(s) and/or the like.

In an embodiment, operations information may include labor information associated with a production environment. Labor information may include information about one or more operators in a production environment, such as, for example, skills, schedules, availabilities and/or the like.

Operations information may be received 300 from one or more user computing devices via one or more user interfaces. For example, a user of a user computing device may provide operations information for a particular production environment using a web-based user interface on the user computing device. In an embodiment, at least a portion of operations information may be manually provided by a user. For example, a user may manually enter or otherwise upload at least a portion of operations information to a host computing device.

In an alternate embodiment, at least a portion of operations information may be automatically received by a host computing device from a user computing device. For instance, a user may enter operations information via a user computing device. As another example, operations information may be received by a user computing device from one or more production devices in a production environment. The operations information may be automatically transmitted to and received by a host computing device. For example, operations information may be periodically transmitted from a user computing device to a host computing device.

In an embodiment, a host computing device may determine 302 one or more performance metrics associated with a production environment. The host computing device may use at least a portion of received operations information for a production environment in order to determine 302 one or more performance metrics for the production environment.

Example performance metrics may include without limitation, one or more metrics associated with turnaround time, throughput, work-in-process, cost, lateness, efficiency, processing time and/or the like.

For example, a performance metric may be average turnaround time over a time period, number of late jobs over a time period, a median process cycle efficiency, an average processing time over a time period and/or the like.

In an embodiment, the host computing device may make the determined performance metrics available 304 to a user. For example, the host computing device may cause one or more of the determined performance metrics to be displayed on a user computing device. In another embodiment, a host computing device may generate one or more electronic files containing one or more of the determined performance metrics which the host computing device may make available 304 to a user. An electronic file may be of any suitable format including, without limitation, a word processing document, a spreadsheet, a slide presentation and/or the like.

In an embodiment, a host computing device may send the one or more files to a user computing device or may make the one or more files available for download or other access by a user computer computing device. As an example, a host computing device may generate a spreadsheet of the one or more determined performance metrics for a production environment. The host computing device may transmit the spreadsheet to a user computing device associated with the production environment, or the host computing device may allow the user computing device to download or otherwise access the spreadsheet.

Referring back to FIG. 3, the host computing device may determine 306 whether one or more performance issues exist with a production environment. A performance issue may be a problem, a complication or a difficulty experienced by a production environment that causes the environment to operate below or otherwise outside of its expected or normal operation.

A host computing device may determine 306 whether a performance issue exists by analyzing the determined performance metrics. For example, a host computing device may compare one or more determined performance metrics to one or more expected performance metrics to determine 306 whether a performance issue exists. In an embodiment, a performance issue may exist when one or more performance metric values differ from a normal or expected value, or are outside of a range of normal or expected values. For instance, a host computing device may determine that a performance issue exists if more than 15% of jobs processed by the environment are completed late over a period of time. As another example, a host computing device may determine that a performance issue exists if the average turnaround time for jobs completed over a time period exceeds a threshold value. Additional and/or alternate performance metrics, threshold values and/or ranges may be used within the scope of this disclosure.

If a performance issue is determined 306, a cause of the performance issue may be identified 308. In an embodiment, a host computing device may identify 308 a cause of the performance issue. A host computing device may identify 308 a cause of a performance issue by analyzing at least a portion of the operations information for a production environment. In an embodiment, a host computing device may identify 308 a cause of a performance issue by receiving information pertaining to one or more possible causes of the performance issue. For instance, an operator or user may provide a host computing device with information pertaining to one or more possible causes of a performance issue.

In an embodiment, one or more performance issues may be associated with one or more possible causes. As an example, a high level of utilization may be caused by an insufficient number of production devices, downtime of one or more production devices and/or the like.

For instance, a host computing device may identify lateness as a performance issue for a print shop. The possible causes of the lateness may be: (1) high levels of labor utilization; (2) production device downtime; or (3) excessive utilization of utilization of one or more production devices. A host computing device may analyze at least a portion of the operations information to identify 308 which of the three possible causes is the actual cause.

In an embodiment, a host computing device may recommend 310 one or more solutions to a performance issue. A solution may be one or more actions that may, individually and/or collectively, mitigate the effects or and/or rectify, at least in part, the performance issue. A recommendation may involve a change, modification or other alteration to a resource of a production environment.

In an embodiment, a host computing device may recommend 310 a solution based on one or more simulations that it may run. For example, a host computing device may determine one or more possible resource compositions and/or configurations for a production environment, and may simulate operation of such a production environment to determine whether it mitigates or resolves a performance issue.

In an embodiment, operations information may be collected in a discrete event system model, and one or more automated design simulations may be applied. For example, a simulation may be run and one or more production devices that are highly utilized may be identified. One or more other production devices may be added to the production environment simulation and it may be determined whether one or more performance metrics change. For instance, if twenty production devices in a production environment are highly utilized, then twenty simulations may be conducted, and the new configuration that includes one or more added production devices which results in the most favorable improvement in one or more performance metrics may be recommended. In an embodiment, the new configuration may be used as a basis for one or more further simulations.

As an example, a host computing device may determine that a production environment's lateness is due to excessive utilization of one or more production devices. Excessive utilization may be determined as a cause if the utilization of a production device over a period of time exceeds a threshold value. The host computing device may select one or more other devices to add to the production environment. One or more of the selected devices may be added to the devices of the existing production environment, and/or one or more of the selected devices may replace one or more devices of a production environment to create an updated production environment. In an embodiment, one or more production devices may be selected based on one or more functionalities and/or capabilities of the devices. For example, if a production device that is to be replaced can print, scan and collate, the host computing device may select one or more production devices that individually and/or collectively can print, scan and collate.

In an embodiment, one or more simulations may be run on historical job information associated with the production environment. The host computing device may run one or more simulations of the updated production environment to determine one or more updated performance metrics.

In an embodiment, a host computing device may select a production device composition and/or configuration for recommendation based on the associated performance metrics. For instance, if a performance issue for a production environment was lateness, the host computing device may select the production environment that results in the greatest improvement of the lateness performance metric. In another embodiment, a computing device may select the production environment that results in the greatest improvement in lateness without altering the values of one or more other performance metrics by a certain amount. Additional and/or alternate factors or considerations may be used within the scope of this disclosure.

In an embodiment, the host computing device may cause 312 one or more recommendations to be displayed to a user on a user computing device. For example, if a host computing device determines that a production device of a production environment should be replaced with a different device, the host computing device may cause an indication of this recommendation to be displayed to a user at a user computing device.

As another example, the cause of lateness for a production environment may be identified 308 as high levels of labor utilization for one or more operators in the production environment. A high level of labor utilization may be a level that exceeds a threshold value according to an embodiment. A host computing device may recommend 310 that the schedule of one or more operators be modified to reduce the high level of labor utilization. A host computing device may cause an indication of the operators having a high utilization level and an indication of their corresponding work schedules to be displayed to a user on a user computing device.

In an embodiment, the host computing device may cause a user 312 computing device to display one or more recommendations as to how to reduce the high utilization level associated with Operator 1. For example, the host computing device may recommend 310 reducing Operator 1's hours to 9 am-12 pm on Mondays, and using Operator 2 from 12 pm-5 pm on Mondays. This recommendation may be displayed to a user.

In another embodiment, a user may manually change the composition of operators in a production environment, the schedules of operators in a production environment and/or the like. For example, a host computing device may inform a user that Operator 1 is over utilized on Mondays. The user may manually add one or more other operators to the production environment on Mondays. Additional and/or alternate actions may be taken within the scope of this disclosure.

As another example, the cause of the lateness in a print shop may be identified 308 as downtime of one or more print production devices. The host computing device may recommend 310 one or more solutions to correct the issue, such as, for example, repairing and/or replacing one or more production devices. For example, the host computing device may recommend 310 that the device be serviced by a technician, and may cause 312 this recommendation to be displayed to a user at a user computing device. As another example, a host computing device may recommend 310 that the device be replaced. The host computing device may cause 312 this recommendation to be displayed to a user at a user computing device. In an embodiment, the host computing device may recommend 310 one or more other production devices to replace the problematic production device, and may cause 312 these recommendations to be displayed to a user at a user computing device. In an embodiment, the recommendation may include one or more identifiers associated with one or more production devices such as, for example, a device name, make, model, or other identifier.

Figure 4:
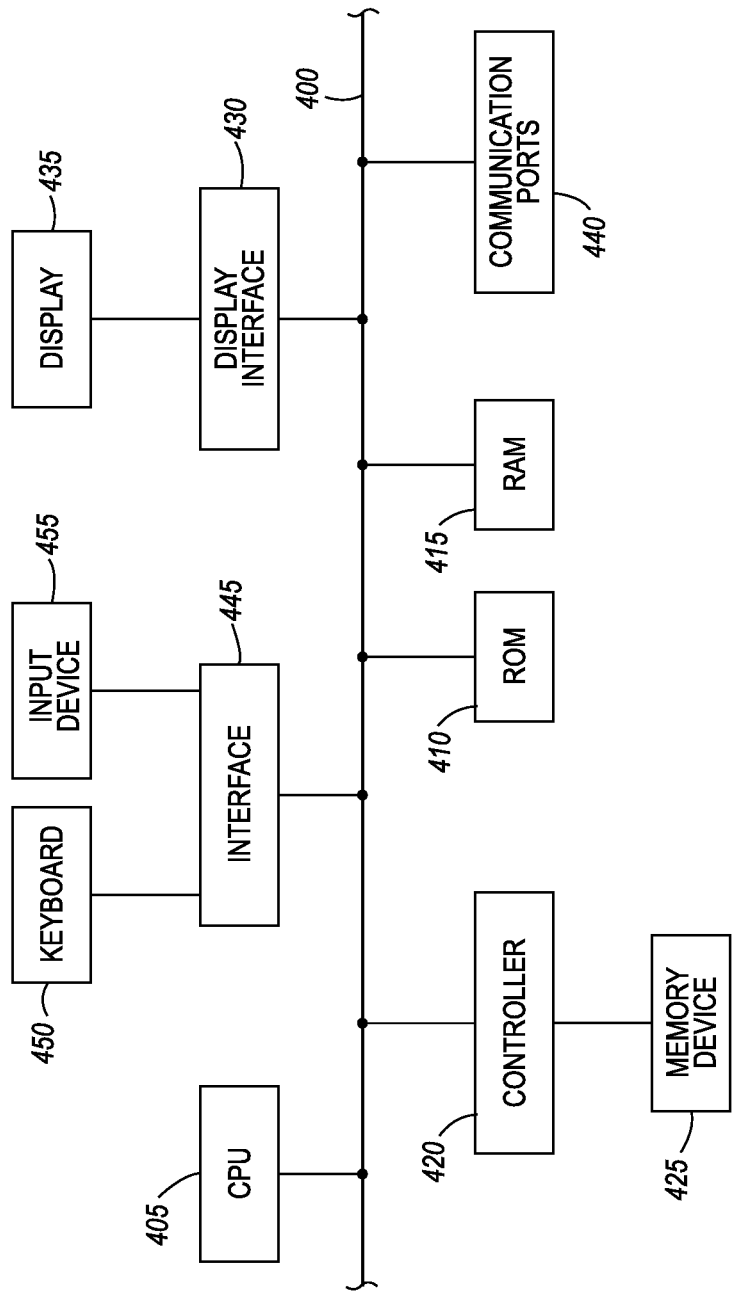
FIG. 4 illustrates a block diagram of example hardware that may be used to contain or implement program instructions according to an embodiment.

FIG. 4 depicts a block diagram of hardware that may be used to contain or implement program instructions. A bus 400 serves as the main information highway interconnecting the other illustrated components of the hardware. CPU 405 is the central processing unit of the system, performing calculations and logic operations required to execute a program. CPU 405, alone or in conjunction with one or more of the other elements disclosed in FIG. 4, is an example of a production device, computing device or processor as such terms are used within this disclosure. Read only memory (ROM) 410 and random access memory (RAM) 415 constitute examples of non-transitory computer-readable storage media.

A controller 420 interfaces with one or more optional non-transitory computer-readable storage media 425 to the system bus 400. These storage media 425 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 410 and/or the RAM 415. Optionally, the program instructions may be stored on a tangible non-transitory computer-readable medium such as a compact disk, a digital disk, flash memory, a memory card, a USB drive, an optical disc storage medium and/or other recording medium.

An optional display interface 430 may permit information from the bus 400 to be displayed on the display 435 in audio, visual, graphic or alphanumeric format. Communication with external devices, such as a printing device, may occur using various communication ports 440. A communication port 440 may be attached to a communications network, such as the Internet or an intranet.

The hardware may also include an interface 445 which allows for receipt of data from input devices such as a keyboard 450 or other input device 455 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of recommending one or more solutions to a performance issue in a print production environment, the method comprising:
  receiving, by a host computing device, operations information associated with a print production environment;
  determining, by the host computing device, one or more performance metrics associated with the print production environment based on at least a portion of the received operations information;

determining whether a performance issue associated with the print production environment exists based on one or more of the performance metrics;

in response to determining that a performance issue exists:

identifying a cause of the performance issue by:
identifying one or more possible causes associated with the performance issue, and
analyzing at least a portion of the operations information to select one of the possible causes as the cause, identifying a different configuration of production devices for the print production environment, running a simulation on the different configuration using historical job information associated with the print production environment to determine whether the different configuration mitigates the performance issue, and in response to determining that the different configuration mitigates the performance issue, recommending the different configuration to a user.

2. The method of claim 1, wherein receiving operations information comprises receiving one or more of the following:

information associated with one or more print jobs processed by the print production environment;

resource information associated with one or more resources of the print production environment; and labor information associated with the print production environment.

3. The method of claim 1, wherein determining whether a performance issue exists comprises:

comparing a value of at least one of the determined performance metrics to an expected value; and in response to the value differing from the expected value, determining that a performance issue exists.

4. The method of claim 1, wherein determining whether a performance issue exists comprises:

comparing a value of at least one of the determined performance metrics to a range of expected values; and in response to the value being outside of the range of expected values, determining that a performance issue exists.

5. The method of claim 1, wherein identifying a cause of the performance issue comprises determining one or more of the following to be the cause:

a high level of labor utilization of one or more operators in the print production environment;

downtime of one or more print production devices in the print production environment; and excessive utilization of the one or more of the print production devices.

6. The method of claim 1, further comprising causing an indication of the different configuration to be displayed at a user computing device.

7. The method of claim 1, wherein determining a cause of the performance issue comprises determining the cause to be one or more of the following:

downtime of one or more print production devices in the print production environment; and excessive utilization of one or more print production devices in the print production environment.

8. A method of recommending one or more solutions to a performance issue in a print production environment, the method comprising:

receiving, by a host computing device, operations information associated with a print production environment;

determining, by the host computing device, one or more performance metrics associated with the print production environment based on at least a portion of the received operations information;

determining whether a performance issue associated with the print production environment exists based on one or more of the performance metrics;

in response to determining that a performance issue exists:

identifying a cause of the performance issue to be a high level of labor utilization of one or more operators in the print production environment by:
identifying the high level of labor utilization to be a possible cause of the performance issue, and
analyzing at least a portion of the operations information to select the high level of labor utilization as the cause, for one or more of the operators,
recommending a change to the schedule of the operator,
causing, by the host computing device, the operator work schedule to be displayed at a user computing device, and
causing, by the host computing device, the recommendation to be displayed at the user computing device.

9. The method of claim 8, wherein receiving operations information comprises receiving one or more of the following:

information associated with one or more print jobs processed by the print production environment;

resource information associated with one or more resources of the print production environment; and labor information associated with the print production environment.

10. The method of claim 8, wherein determining whether a performance issue exists comprises:

comparing a value of at least one of the determined performance metrics to an expected value; and in response to the value differing from the expected value, determining that a performance issue exists.

11. The method of claim 8, wherein determining whether a performance issue exists comprises:

comparing a value of at least one of the determined performance metrics to a range of expected values; and in response to the value being outside of the range of expected values, determining that a performance issue exists.

12. A system for recommending one or more solutions to a performance issue in a print production environment, the system comprising:

a computing device; and a non-transitory computer-readable storage medium in communication with the computing device, wherein the computer-readable storage medium comprises one or more programming instructions that, when executed, cause the computing device to:

receive operations information associated with a print production environment, determine one or more performance metrics associated with the print production environment based on at least a portion of the received operations information, determine whether a performance issue associated with the print production environment exists based on one or more of the performance metrics, in response to determining that a performance issue exists:

identify a cause of the performance issue by:
  identifying one or more possible causes associated with the performance issue, and
  analyzing at least a portion of the operations information to select one of the possible causes as the cause,
identify a different configuration of production devices for the print production environment,
run a simulation on the different configuration using historical job information associated with the print production environment to determine whether the different configuration mitigates the performance issue, and
in response to determining that the different configuration mitigates the performance issue, recommend the different configuration to a user.

13. The system of claim 12, wherein the one or more programming instructions that, when executed, cause the computing device to receive operations information comprise one or more programming instructions that, when executed, cause the computing device to receive one or more of the following:
  information associated with one or more print jobs processed by the print production environment;
  resource information associated with one or more resources of the print production environment; and
  labor information associated with the print production environment.

14. The system of claim 12, wherein the one or more programming instructions that, when executed, cause the computing device to determine whether a performance issue exists comprise one or more programming instructions that, when executed, cause the computing device to:
  compare a value of at least one of the determined performance metrics to an expected value; and
  in response to the value differing from the expected value, determine that a performance issue exists.

15. The system of claim 12, wherein the one or more programming instructions that, when executed, cause the computing device to determine whether a performance issue exists comprise one or more programming instructions that, when executed, cause the computing device to:
  compare a value of at least one of the determined performance metrics to a range of expected values; and
  in response to the value being outside of the range of expected values, determine that a performance issue exists.

16. The system of claim 12, wherein the one or more programming instructions that, when executed, cause the computing device to identify a cause of the performance issue comprise one or more programming instructions that, when executed, cause the computing device to determine one or more of the following to be the cause:
  a high level of labor utilization of one or more operators in the print production environment;
  downtime of one or more print production devices in the print production environment; and
  excessive utilization of the one or more of the print production devices.

17. The system of claim 12, wherein the computer-readable storage medium further comprises one or more programming instructions that, when executed, cause the computing device to cause an indication of the different configuration to be displayed at a user computing device.

18. The system of claim 12, wherein the one or more programming instructions that, when executed, cause the computing device to identify a cause of the performance issue comprise one or more programming instructions that, when executed, cause the computing device to determine the cause to be one or more of the following:
  downtime of one or more print production devices in the print production environment; and
  excessive utilization of one or more print production devices in the print production environment.

* * * * *